(12) United States Patent
Chen et al.

(10) Patent No.: US 8,719,303 B2
(45) Date of Patent: May 6, 2014

(54) METHOD FOR ENHANCING THE COMPUTATION OF CSS AND ACCURACY OF COMPUTING HARDWARE AND TO PROMOTE THE COMPUTATION SPEED

(76) Inventors: Juei-Chao Chen, Taipei (TW); Kuo-Hung Lo, Taipei (TW); Tien-Lung Sun, Taipei (TW)

( * ) Notice: Subject to any disclaimer, the term of this patent is extended or adjusted under 35 U.S.C. 154(b) by 1174 days.

(21) Appl. No.: 12/318,331

(22) Filed: Dec. 24, 2008

(65) Prior Publication Data
US 2009/0172064 A1    Jul. 2, 2009

(51) Int. Cl.
*G06F 17/30* (2006.01)

(52) U.S. Cl.
USPC ........... 707/791; 707/792; 707/793; 707/802; 708/446; 708/521; 455/114.2; 702/94; 381/18; 381/20

(58) Field of Classification Search
USPC .................. 707/791, 792, 793, 802, 999.006; 708/446, 521; 455/114.2; 702/94; 381/18, 20
See application file for complete search history.

(56) References Cited

U.S. PATENT DOCUMENTS

| | | | |
|---|---|---|---|
| 6,688,445 B2* | 2/2004 | Otto | 192/85.51 |
| 6,697,491 B1* | 2/2004 | Griesinger | 381/20 |
| 2003/0167267 A1* | 9/2003 | Kawatani | 707/6 |
| 2007/0288187 A1* | 12/2007 | Finkler et al. | 702/94 |
| 2008/0207147 A1* | 8/2008 | Rofougaran | 455/114.2 |
| 2009/0172064 A1* | 7/2009 | Chen | 708/446 |

* cited by examiner

*Primary Examiner* — Syling Yen
(74) *Attorney, Agent, or Firm* — Muncy, Geissler, Olds & Lowe, P.C.

(57) ABSTRACT

This invention proposed a new algorithm. By multiply the proposed weight coefficients of this invention, CSP and CSS can be computed without computing for the mean(s) of the data. After the proposed weight coefficients of this invention undergo factorization, it can promote a new recursive and real time updatable computation method. To test the accuracy of the new invention, the StRD data were separately tested using SAS ver 9.0, SPSS ver15.0 and EXCEL 2007 for comparison. The results showed that the accuracy of the results of the proposed invention exceeds the level of accuracy of SAS ver9.0, SPSS ver15.0 and EXCEL 2007. Aside from an accurate computation, this new invented algorithm can also produce efficient computations.

3 Claims, No Drawings

METHOD FOR ENHANCING THE COMPUTATION OF CSS AND ACCURACY OF COMPUTING HARDWARE AND TO PROMOTE THE COMPUTATION SPEED

TECHNICAL FIELD OF THE INVENTION

This invention is related to a method to statistical analysis and data mining. It used hardware to compute for Corrected Sums of Products (CSP) and Corrected Sums of Squares (CSS) related algorithms and used a great deal of real-time updatable computations of the 5 ways of data analysis techniques:
A. Univariate: the computation of the variance and the standard deviation
B. Bivariate: the computation of the covariance and the correlation coefficient
C. Computation of analysis of variance
D. Computation of regression analysis
E. Multivariate: Computation of the variance-covariance matrix and correlation matrix

DESCRIPTION OF THE PRIOR ART

To analyze the related prior arts of this invention, this section was divided into 8 statements. The 8 statements are as follows: $1^{st}$ statement: introduce CSP and its special case—Corrected Sum of Squares (CSS). $2^{nd}$ statement: introduce of CSP computation algorithms. $3^{rd}$ statement: introduce of CSS computation algorithms. $4^{th}$ statement: indicate the previous algorithms which were used to compare accuracy with this invention. $5^{th}$ statement: the new CSP algorithm proposed by the inventor. $6^{th}$ statement: describe the application demands of updatable computations. $7^{th}$ statement: describe the further development of the computation algorithm of the $5^{th}$ statement for updatable computation for improvement. $8^{th}$ statement: describe the accuracy problems produced by the mathematic functions of CSP method in the various softwares.

1. In the computation of data analysis, n of two variables were considered as data where the $1^{st}$ pair is $(x_1, y_1)$, the $2^{nd}$ pair is $(x_2, y_2)$ and continuously go on to the $n^{th}$ pair is $(x_n, y_n)$. The mean of n data is computed by adding the n data then divided by the total number of n. The mean of the two variables is separately shown as $$\bar{x}_n = \frac{1}{n}\sum_{i=1}^{n} x_i,$$

$$\bar{y}_n = \frac{1}{n}\sum_{i=1}^{n} y_i.$$

Each of the data is separately subtracted to the mean, in other words, $(x_i, y_i)$ of the i data is separately subtracted to $\bar{x}$ and $\bar{y}$ then adding the total after multiplication. It is known as Corrected Sums of Products (CSP) with the equation:

$$CSP_n = \sum_{i=1}^{n} (x_i - \bar{x}_n)(y_i - \bar{y}_n). \tag{1}$$

When CSP is divided by n−1, it is the covariance of $(x_1, y_1)$, $(x_2, y_2), \ldots, (x_n, y_n)$, and denote as $\sigma_{XY}$. The equation is:

$$\sigma_{XY} = \frac{1}{n-1} CSP_n.$$

If the $y_i$ in (1) is substituted by $x_i$ and $\bar{y}$ is substituted by $\bar{x}$, it becomes single variable special case. This special case is called Corrected Sums of Squares (CSS), with the equation:

$$CSS_n = \sum_{i=1}^{n} (x_i - \bar{x}_n)(x_i - \bar{x}_n). \tag{2}$$

To compute for the variance, divided CSS by n−1. The equation is:

$$\mathrm{Var}(X) = \frac{1}{n-1} CSS_n.$$

To compute for the standard deviation, get the positive square root of the variance. The standard deviation is denoted as $\sigma_X$. The equation is:
$$\sigma_X = \sqrt{\mathrm{Var}(X)}.$$

If the covariance of X and Y is divided by the standard deviation of the two variables, it is called correlation coefficient which is denoted as $\rho_{XY}$. The equation is:

$$\rho_{XY} = \frac{\sigma_{XY}}{\sigma_X \sigma_Y}.$$

CSP and CSS are generally called Corrected Sums of Squares and Products (CSSP). In data analysis, many use the value of the variance and standard deviation of the data in determining cases of dispersion. Larger value of variance means data are more disperse, otherwise, the data are more centered closely to the mean. Correlation coefficient is used to determine the linear relationship between two variables. The correlation coefficient lies between +1 and −1. The closer the value is to 0, the linear relationship between the two variables is lesser, and otherwise, the linear relationship is greater. The computation of the Analysis of Variance (ANOVA) also uses CSP as the foundation. It is unnecessary to emphasize the importance of computing of CSP. For a long time, the accuracy and efficiency of computing CSP are given importance by both scholars and users alike.

2. The CSP algorithms proposed by scholars in the past were:
   (i) Welford (1962) Algorithm
      Welford (1962), using (1) as foundation, developed an algorithm to compute CSP. The mean of k data $(x_1, x_2, \ldots, x_k)$ is $\bar{x}_k$. The computation method of CSP of k data is denote as $CSP_{Welford(k)}$. The algorithm is $$CSP_{Welford(k)} = CSP_{Welford(k-1)} + \left(\frac{k-1}{k}\right)(x_k - \bar{x}_{k-1})(y_k - \bar{y}_{k-1}) \tag{3}$$

where, $$\bar{x}_k = \frac{k-1}{k}\bar{x}_{k-1} + \frac{1}{k}x_k,$$

$$\bar{y}_k = \frac{k-1}{k}\bar{y}_{k-1} + \frac{1}{k}y_k,$$

$$\bar{x}_{k-1} = \frac{1}{k-1}\sum_{i=1}^{k-1}x_i,$$

$$\bar{y}_{k-1} = \frac{1}{k-1}\sum_{i=1}^{k-1}y_i, k = 2, 3, \ldots, n.$$

(ii) Neely (1966) Algorithm

Neely (1966) proposed an algorithm to improve the accuracy of computing CSP. Neely used (1) as the foundation. In the right hand side of equation (1), the equation is obtained by subtracting $$\sum_{i=1}^{n}(x_i - \bar{x}_n)(y_i - \bar{y}_n) \text{ to } \frac{1}{n}\left(\sum_{i=1}^{n}(x_i - \bar{x}_n)\right)\left(\sum_{i=1}^{n}(y_i - \bar{y}_n)\right).$$

The CSP of n data in Neely's algorithm is denote as $CSP_{Neely(n)}$ and $$CSP_{Neely(n)} = \sum_{i=1}^{n}(x_i - \bar{x}_n)(y_i - \bar{y}_n) - \frac{1}{n}\left[\sum_{i=1}^{n}(x_i - \bar{x}_n)\right]\left[\sum_{i=1}^{n}(y_i - \bar{y}_n)\right]. \quad (4)$$

(iii) Youngs and Cramer (1971)

Youngs and Cramer (1971) used (1) as the foundation in the developed an algorithm to compute CSP. In the n of two variables data, the $1^{st}$ is $(x_1, y_1)$, the $2^{nd}$ is $(x_2, y_2)$ and continuously go on to the $n^{th}$ is $(x_n, y_n)$. When the $1^{st}$ data of the $1^{st}$ variable reached the total sum of $k^{th}$ data $x_1, x_2, \ldots, x_k$, it is noted as $t_k$, that is $$t_k = \sum_{i=1}^{k}x_i.$$

When the $2^{nd}$ variable of the $1^{st}$ data reached the total sum of $k^{th}$ data $y_1, y_2, \ldots, y_k$, it is noted as $$t'_k \text{ and } t'_k = \sum_{i=1}^{k}y_i.$$

The CSP of k data is denote as $CSP_{YC(k)}$. The algorithm proposed by Youngs and Cramer (1971) is:

$$CSP_{YC(k)} = CSP_{YC(k-1)} + (x_k - t_{k-1})(y_k - t'_{k-1})\frac{1}{k(k-1)}, \quad (5)$$

$$k = 2, 3, \ldots, n.$$

(iv) Clarke (1971)

The theory of Clarke's (1971) algorithm is similar with Welford's (1962) algorithm. With regards to the k data of the two variables, the $1^{st}$ $(x_1, y_1)$, the $2^{nd}$ is $(x_2, y_2)$ and continuously go on to the $n^{th}$ is $(x_n, y_n)$. The CSP of k data is denote as $CSP_{Clarke(k)}$. The algorithm developed by Clarke (1971) is $$CSP_{Clarke(k)} = CSP_{Clarke(k-1)} + \left(1 - \frac{1}{k}\right)(x_k - \bar{x}_{k-1})(y_k - \bar{y}_{k-1}), \quad (6)$$

where $$\bar{x}_k = \bar{x}_{k-1} + (x_k - \bar{x}_{k-1})\frac{1}{k},$$

and $$\bar{y}_k = \bar{y}_{k-1} + (y_k - \bar{y}_{k-1})\frac{1}{k}, k = 2, 3, \ldots, n.$$

3. Aside from the CSP algorithms enumerated in the $2^{nd}$ statement, scholars have proposed various CSS algorithms based from the special case of CSP. According to the classification of Chan et al. (1983), it can be classified into two major kinds, two-pass algorithm and one-pass algorithm.

(i) Two-Pass Algorithm

Two-pass algorithm pointed out that all computed data should be read twice by the computing hardware. There were two types of two-pass algorithm developed in the past. The $1^{st}$ type directly used equation (2) for computation. This type of algorithm was termed by Chan and Lewis (1979) and Chan et al. (1983) as "standard two-pass algorithm". As for the $2^{nd}$ type, a corrected term was subtracted to equation (2) as shown in the equation below:

$$CSS_n = \sum_{i=1}^{n}(x_i - \bar{x}_n)^2 - \frac{1}{n}\left(\sum_{i=1}^{n}(x_i - \bar{x}_n)\right)^2, \quad (7)$$

where $\frac{1}{n}\left(\sum_{i=1}^{n}(x_i - \bar{x}_n)\right)^2$ is the corrected term. Neely (1966) was the earliest scholar to proposed equation (7). This type of algorithm was termed as "corrected two-pass algorithm". The discussion and applications of this algorithm can be found in Chan and Lewis (1979), Chan et al. (1979), Roberts (1985), Thisted (1988), Press et al. (2002) and Gentle et al.(2004). In mathematics, equation (7) is equivalent to equation (2) and the corrected term can be omitted since it is only for correction purposes because using computer in computing caused errors in the results. Aside from the two types of two-pass algorithm mentioned above, the book of Thisted (1988) also indicated another type where the data should be sorted in sequential order first then undergo standard two-pass algorithm afterward. Thisted (1988) pointed out that this type of algorithm is a type of three-pass algorithm.

(ii) One-Pass Algorithm

One-pass algorithm pointed out that all computed data should be read once by the computing hardware. Welford (1962), Van Reeken (1968), Youngs and Cramer (1971), Spicer (1972), Hanson (1975), Cotton (1975), Nelson (1979), West (1979) and Chan et al. (1979) all proposed different types of one-pass algorithm.

In the articles related to the accuracy of various CSS computation algorithms, the research results of West (1979) and Chan and Lewis (1979) pointed out that the most accurate one-pass algorithm is West's (1979) but it is not as accurate as "standard two pass algorithm".

In addition, in the study of Chan et al. (1983), "error bound for relative error" was used to compare computation errors in different algorithms. The relative error indicated by Chan et al. (1983) is:

$$RE = \left| \frac{exact - output}{exact} \right|$$

where RE represents "relative error" and "output" represents the computation result. Chan et al. (1983) pointed out that the relative error bounds of the "corrected two-pass algorithm" is smaller than the error bounds of "standard two-pass algorithm". With regards to the conclusion proposed by Chan et al. (1983), Heiberger (1989) pointed out that when computing for CSS, the "corrected two-pass algorithm" should compute for the mean first and the accuracy in the computation of the mean should be limited to the result of the algorithm of the mean itself. The "corrected two-pass algorithm" was recommended by Press et al. (2002).

Up to the present, there are still no research reports that directly discuss about the accuracy in the computation of CSP but many scholars in the past discussed about the special univariate cases of CSP or in other words, the accuracy in the computation of CSS.

4. In the four types of CSP algorithms in the $2^{nd}$ statement, the algorithm of Neely (1966) is a two-pass algorithm and the algorithm proposed by Welford (1962), Youngs and Cramer (1971) and Clarke (1971) belongs to one-pass algorithm. Although no studies discussed about the accuracy of CSP algorithms in the past, many studies discussed and compared on the accuracy of the different CSS algorithms. This invention used CSS to certify accuracy. In the comparison of accuracy, up until now, Chan et al. (1983), Thisted (1988), McCullough (1998) and Gentle et al. (2004) all believed that the accuracy of "corrected two-pass algorithm" is better than "standard two-pass algorithm's". Therefore, this invention used the "corrected two-pass algorithm" for comparison.

5. This study proposed a successive difference as foundation, combined the developed weight coefficients ($w_{ij}$) and proposed a new CSP computation algorithm. The definition of successive difference can be found in the literature of Von Neumann et al. (1941) or Rao (1959). With regards to the n of two variables as data, the $1^{st}$ is $(x_1, y_1)$ the $2^{nd}$ is $(x_2, y_2)$ and continuously go on to the $n^{th}$ is $(x_n, y_n)$. Defined $x_0=0$, the $i^{th}$ successive difference of variable x is to subtract $i^{th}$ $x_i$ to $i-1^{th}$ $x_{i-1}$, symbolized with the equation $sdx_i=x_i-x_{i-1}$, among which i=1, 2, ..., n. Defined $y_0=0$, the $j^{th}$ successive difference of variable y is to subtract $j^{th}$ $y_j$ to $j-1^{th}$ $y_{j-1}$, symbolized with the equation $sdy_j=y_j-y_{j-1}$, among which j=1,2, ..., n. The CSP of the n data can be shown as:

$$CSP_n = \frac{1}{n}\sum_{i=1}^{n}\sum_{j=1}^{n} w_{ij} sdx_i sdy_j \quad (8)$$
$$= \frac{1}{n}\sum_{i=1}^{n}\sum_{j=1}^{n} w_{ij}(x_i - x_{i-1})(y_j - y_{j-1}),$$

where, $$w_{ij}=(i+j-1)(n+1)-ij-n/2(i+j+|i-j|), i=1, 2, \ldots, n, j=1, 2, \ldots, n. \quad (9)$$

The detailed mathematical proof of equation (8) can be found in Appendix 1. Nevertheless, the result of the equation (8) can be expressed using matrix where the proof is shown in Appendix 1.

The successive difference vector of the $1^{st}$ variable x is represented by $d_{n\times 1}$ and the $i^{th}$ element is represented by $sdx_i$. The successive difference vector of the $2^{nd}$ variable y is represented by $e_{n\times 1}$ and the $i^{th}$ element is represented by $sdy_i$. The successive difference vector of the two variables is separately represented as:

$$d_{n\times 1} = \begin{bmatrix} sdx_1 \\ sdx_2 \\ \vdots \\ sdx_n \end{bmatrix} \text{ and } e_{n\times 1} = \begin{bmatrix} sdy_1 \\ sdy_2 \\ \vdots \\ sdy_n \end{bmatrix},$$

and equation (8) can be rewritten in matrix as:

$$CSP_n = \frac{1}{n} d_{1\times n}^T W_{n\times n} e_{n\times 1}, \quad (10)$$

where, the element of row i and column j of matrix W is shown in equation (9), also $$nCSP_n = d_{1\times n}^T W_{n\times n} e_{n\times 1}, \quad (11)$$

6. With regards to the sequence of the continuously collected data, the $1^{st}$ data is represented as $(x_1, y_1)$, the $2^{nd}$ data is represented as $(x_2, y^2)$, and continuously go on to the $n^{th}$ data which is represented by $(x_n, y_n)$. The n+$1^{th}$ data was represented by $(x_{n+1}, y_{n+1})$ and so on. The sequence of the continuously collected data is represented as:

$(x_1, y_1), (x_2, y_2), \ldots, (x_n, y_n), (x_{n+1}, y_{n+1}), \ldots$

Using $CSP_n$ to represent the result of n data's computation, the updated computation is using $CSP_n$ to add a new updating data in n+$1^{th}$ data $(x_{n+1}, y_{n+1})$. The equation is shown as:

$CSP_{n+1}=CSP_n$+updating term.

With regards to the CSP method of the sequence of the continuously collected data, it should possess a highly accurate computation and updatable computation capabilities. Aside from economizing the use of hardware resources, it can also support the essential dynamic data analysis.

7. If equation (8) was directly express as a computer algorithm, aside from confirming the total number of data first, it also cannot provide real time updatable computations. The computer algorithm for equation (8) is:

css:=0
ncss:=0
ss:=0
$X_0$:=0
for i:=1 to n do
   $sdx_i$:=$X_i-X_{i-1}$
for i:=1 to n do
   for j:=1 to n do
      ss:=$w_{ij}\times sdx_i \times sdx_j$
      ncss:=ncss+ss
css:=ncss/n 8. Up until now, there are no past cases that directly discuss about the accuracy of CSP. Aside from the $3^{rd}$ and $4^{th}$ statement where the scholars discuss about special cases of CSP and the accuracy of CSS, many scholars also studied and discussed on the accuracy of the algorithms related to CSS in data analysis software packages. Past scholars discovered that inaccurate results occur when software were applied to CSS related algorithms. For example, the studies of Simon and Lesage (1989) and McCullough (1998, 1999) pointed out that the CSS computation of the software SAS, SPSS and BMDP will produce inaccurate results. McCullough (1998, 1999), Knüsel (2002), Cryer (2002), Keeling and Pavur (2004), Altman et al. (2004), McCullough and Wilson (1999, 2002, 2005) pointed out that the standard deviation or the variance computations of Micro-soft Excel will produce inaccurate results.

SUMMARY OF THE INVENTION

Using equation (10) as a foundation and factorize the matrix W, this invention developed a new method that can real time update computations. The obtained results were used to improve the shortcoming of equation (8) which is the inability to real time update computations.

This invention proposed a successive difference as foundation, combined the developed weight coefficient ($w_{ij}$) and proposed a new CSP computation algorithm. The characteristics of this invention are the factorization of the weight coefficient matrix $W_{n \times n}$. Aside from being recursive, the proposed algorithm can also do real time updatable computation. This new algorithm also has the quality of having a high level of accuracy.

The accuracy of the proposed algorithm of this invention was compared with the accuracy of the Statistical Reference Datasets (StRD) provided by the National Institutes of Standards and Technology (NIST). The measurement of the accuracy of the computation was based on Altman et al. (2004), the study pointed out that "the so-called precision is the dissimilarity between exact value and result. It is represented by the gap between the exact value and the result". With regards to the dissimilarity results, Altman et al. (2004) adopted log relative error (LRE) for measurement. Log relative error (LRE) is the $\log_{10}$ of the absolute value of the difference between the exact value and the result divided by the exact value. The definition of LRE in the book of Altman et al. (2004) was:

$$LRE = \begin{cases} -\log_{10}\left|\frac{exact - result}{exact}\right|, & \text{if exact value} \neq 0 \\ -\log_{10}|result - exact|, & \text{if exact value} = 0 \end{cases} \quad (12)$$

When the result is equals to the exact value and it was marked by "exact". The size of the LRE is used to represent the length of the significant digits of the accuracy of the data's computation. As for the measurement of the accuracy of hardware computation results of LRE, please refer to earlier publications like Wampler (1980) and Lesage and Simon (1985). In addition, Simon and Lesage (1988, 1989), McCullough (1998, 1999), McCullough and Wilson (1999, 2002, 2005) adopted LRE to measure the computation accuracy of the software applied by the computer. This study adopted LRE to test and compare for the accuracy of the computation results.

The theorem adopted in this invention is to perform a two stage factorization on the matrix $W_{n \times n}$ of the equation (11). Then, propose a new CSP algorithm that is recursive and can be updated base on the results of the factorization. The two stage factorization of the matrix $W_{n \times n}$ is as follows:

Stage 1

In matrix $W_{n \times n}$, the element of row i and column j is shown as $w_{ij(n)}$, $$w_{ij(n)} = (i + j - 1)(n + 1) - ij - \frac{n}{2}(i + j + |i - j|)$$

Also, matrix $W_{n \times n}$ can be factorized into the sum of two matrices, as $$W_{n \times n} = \begin{bmatrix} w_{11} & w_{12} & w_{13} & \cdots & w_{1n} \\ w_{21} & w_{22} & w_{23} & \cdots & w_{2n} \\ w_{31} & w_{32} & w_{33} & \cdots & w_{3n} \\ \vdots & \vdots & \vdots & \ddots & \vdots \\ w_{n1} & w_{n2} & w_{n3} & \cdots & w_{nn} \end{bmatrix} \quad (13)$$

$$= \begin{bmatrix} W_{(n-1)\times(n-1)} & 0_{(n-1)\times 1} \\ 0_{1\times(n-1)} & 0 \end{bmatrix}_{n \times n} + G_{n \times n},$$

where, the element of row i and column j of matrix $W_{(n-1) \times (n-1)}$ is represented with $W_{ij(n-1)}$, thus $$w_{ij(n-1)} = (i + j - 1)n - ij - \frac{n-1}{2}(i + j + |i - j|).$$

The element of row i and column j of $G_{n \times n}$ is represented with $g_{ij(n)}$, thus $$g_{ij(n)} = \frac{1}{2}(i + j - |i - j| - 2),$$

i=1,2, ... , n, j=1,2, ... , n, and $0_{1 \times (n-1)} = [0\ 0\ \ldots\ 0]_{1 \times (n-1)}$, $$0_{(n-1) \times 1} = \begin{bmatrix} 0 \\ 0 \\ \vdots \\ 0 \end{bmatrix}_{(n-1) \times 1}.$$

Stage 2. Decompose the matrix $G_{n \times n}$ in stage 1, as $$G_{n \times n} = \begin{bmatrix} G_{(n-1) \times (n-1)} & M_{(n-1) \times 1} \\ M^T_{1 \times (n-1)} & (n-1) \end{bmatrix}, \quad (14)$$

where, $M_{1 \times (n-1)}^T = [0\ 1\ \ldots\ n-2]_{1 \times (n-1)}$.

The theorem used in this invention is to combine the two stages of the factorized matrix $W_{n \times n}$, equation (13) and (14), and plug into equation (11). The details of the process are shown in the two steps below:

Step 1: substitute the factorization results of matrix W and get $$nCSP_n = d^T_{1 \times n} W_{n \times n} e_{n \times 1} \quad (15)$$

$$= d^T_{1 \times n} \left( \begin{bmatrix} W_{(n-1) \times (n-1)} & 0_{(n-1) \times 1} \\ 0_{1 \times (n-1)} & 0 \end{bmatrix}_{n \times n} + G_{n \times n} \right) e_{n \times 1}$$

-continued $$= d_{1\times n}^T \begin{bmatrix} W_{(n-1)\times(n-1)} & 0_{(n-1)\times 1} \\ 0_{1\times(n-1)} & 0 \end{bmatrix}_{n\times n} e_{n\times 1} + d_{1\times n}^T G_{n\times n} e_{n\times 1}$$

$$= (n-1)CSP_{n-1} + d_{1\times n}^T G_{n\times n} e_{n\times 1}. \quad\quad 5$$

Step 2: substitute the results of matrix $G_{n\times n}$ into (15).
Define $SP_n = d_{1\times n}^T G_{n\times n} e_{n\times 1}$ and $SP_{n-1} = d_{1\times(n-1)}^T G_{(n-1)\times(n-1)} e_{(n-1)\times 1}$ thus:

$$SP_n = d_{1\times n}^T G_{n\times n} e_{n\times 1}$$

$$= d_{1\times n}^T \begin{bmatrix} G_{(n-1)\times(n-1)} & M_{(n-1)\times 1} \\ M_{1\times(n-1)}^T & (n-1) \end{bmatrix}_{n\times n} e_{n\times 1}$$

$$= d_{1\times(n-1)}^T G_{(n-1)\times(n-1)} e_{(n-1)\times 1} +$$
$$d_{1\times(n-1)}^T M_{(n-1)\times 1} sdy_n + sdx_n M_{1\times(n-1)}^T e_{(n-1)\times 1} +$$
$$(n-1)sdx_n sdy_n,$$

Next, separately rewrite $d_{1\times(n-1)}^T M_{(n-1)\times 1}$ and $M_{1\times(n-1)}^T e_{(n-1)\times 1}$ as $$d_{1\times(n-1)}^T M_{(n-1)\times 1} = \sum_{i=1}^{n-1}(n-1)sdx_i,$$

$$M_{1\times(n-1)}^T e_{(n-1)\times 1} = \sum_{i=1}^{n-1}(n-1)sdy_i.$$

To obtain $$SP_n = SP_{n-1} + \left(\sum_{i=1}^{n-1}(i-1)sdx_i\right)sdy_n + \quad\quad (16)$$
$$\left(\sum_{i=1}^{n-1}(i-1)sdy_i\right)sdx_n + (n-1)sdx_n sdy_n.$$

Lastly, merge the results of equation (15) and (16). The new computation algorithm of this invention is:

$$nCSP_n = (n-1)CSP_{n-1} + SP_n, \quad\quad (17)$$
$$SP_n = SP_{n-1} + \left(\sum_{i=1}^{n-1}(i-1)sdx_i\right)sdy_n +$$
$$\left(\sum_{i=1}^{n-1}(i-1)sdy_i\right)sdx_n + (n-1)sdx_n sdy_n.$$

The concrete steps of equation (17) executed in the computing hardware are:

Step 1: Define the variables when the algorithm executed in the hardware

First define the variables used in the computation. The initial value is 0, The variables are shown as follows:

The successive difference of the $1^{st}$ variable is shown as sdx which is also $sdx_i$ in equation (17). i=1 in the $1^{st}$ turn, i=2 in the $2^{nd}$ turn and so on.

The successive difference of the $2^{nd}$ variable is shown as sdy which is also $sdy_i$ in equation (17). i=1 in the $1^{st}$ turn, i=2 in the $2^{nd}$ turn and so on.

The iterated weighted sum of the successive difference of the $1^{st}$ variable is shown as isum_sdx which is also $$\left(\sum_{i=1}^{n-1}(i-1)sdx_i\right)$$

in equation (17). isum_sdx=0 in the $1^{st}$ turn, n=2 in the $2^{nd}$ turn and so on.

The iterated weighted sum of the successive difference of the $2^{nd}$ variable is shown as isum_sdy which is also $$\left(\sum_{i=1}^{n-1}(i-1)sdy_i\right)$$

in equation (17). isum_sdy=0 in the $1^{st}$ turn, n=2 in the $2^{nd}$ turn and so on.

Define sp, shown as $SP_n$ in equation (17).
Define ncsp, shown as nCSP in equation (17).
Step 2:
Compute for the "successive difference" values of the two variables, $sdx_i$ and $sdy_i$
Step 3:
(i) multiply (i−1) with $sdx_i$, then multiply again with $sdy_i$
(ii) multiply isum_sdx with sdy and multiply isum_sdy with sdx
Add all the values of (i) and (ii), then add sp from the previous step and save it in sp
Step 4:
After adding ncsp to the sp of step 3, save in ncsp
Step 5:
Do the recursive computation of isum_sdx and isum_sdy
(i) multiply (i−1) with $sdx_i$, add isum_sdx, then save in isum_sdx
(ii) multiply (i−1) with $sdy_i$, add isum_sdy, then save in isum_sdy
When entered the $(i+1)^{th}$ data, return to step 1.
The steps shown above can be written as the computation program executed in the hardware:
  csp:=0
  sp:=0
  isum_sdx:=0
  isum_sdy:=0
  $X_0$=0
  $Y_0$=0
  for i:=1 to n
    sdx:=$X_i$−$X_{i-1}$
    sdy:=$Y_i$−$Y_{i-1}$
      sp:=sp+isum_sdx*sdy+isum_sdy*sdx+(i−1)*sdx*sdy
    ncsp:=ncsp+sp
    isum_sdx:=isum_sdx+(i−1)*sdx
    isum_sdy:=isum_sdy+(i−1)*sdy
  csp:=ncsp/n Concrete Solutions of this Invention to the Problems:
1. With a high accuracy, this invention improved the efficiency of equation (8) and the problem of not being able to perform a real time updatable computation.
2. The algorithm of CSP still can generalize to compute covariance, correlation coefficient and the computations of the variance-covariance matrices of multivariate and other related matrices which can solve the inefficiency of the computation.

BRIEF DESCRIPTION OF THE DRAWINGS

None

DETAILED DESCRIPTION OF THE PREFERRED EMBODIMENTS

This invention used the data for quality control from Company xx's semiconductor processing as an example. In the etching process of semiconductor, the automatic measuring system automatically measures the width and depth of the four-point test in every semi-finished productions. The actual semi-finished productions data used in this invention are:
Width: 237, 236, 235, 236
Depth: 128, 127, 126, 127

The steps of this invention's computation method are:
First, define the variable used in the computation and the initial value is 0
Define six variables $sdx=0$, $sdy=0$, $isum\_sdx=0$, $isum\_sdy=0$, $sp=0$, and $ncsp=0$
Input $1^{st}$ Set of Data:
  Step 1:
    Compute the "successive difference" values of two variables,
    $sdx_1=237-0=237$
    $sdy_1=128-0=128$
  Step 2:
    $sp=0+0\times237+0\times128+(1-1)\times237\times128=0$
  Step 3:
    $ncsp=0+0=0$
  Step 4:
    $isum\_sdx=0+(1-1)\times237=0$
    $isum\_sdy=0+(1-1)\times128=0$
Input $2^{nd}$ Set of Data:
  Step 1:
    Compute the "successive difference" values of two variables,
    $sdx_2=236-237=-1$
    $sdy_2=127-128=-1$
  Step 2:
    $sp=0+0\times(-1)+0\times(-1)+(2-1)\times(-1)\times(-1)=1$
  Step 3:
    $ncsp=0+1=1$
  Step 4:
    $isum\_sdx=0+(2-1)\times(-1)=-1$
    $isum\_sdy=0+(2-1)\times(-1)=-1$
Input $3^{rd}$ Set of Data:
  Step 1:
    Compute the "successive difference" values of two variables,
    $sdx_3=235-236=-1$
    $sdy_3=126-127=-1$
  Step 2:
    $sp=1+(-1)\times(-1)+(-1)\times(-1)+(3-1)\times(-1)\times(-1)=5$
  Step 3:
    $ncsp=1+5=6$
  Step 4:
    $isum\_sdx=-1+(3-1)\times(-1)=-3$
    $isum\_sdy=-1+(3-1)\times(-1)=-3$
Input $4^{th}$ Set of Data:
  Step 1:
    Compute the "successive difference" values of two variables,
    $sdx_4=236-235=1$
    $sdy_4=127-126=1$
  Step 2:
    $sp=5+(-3)\times1+(-3)\times1+(4-1)\times1\times1=2$
  Step 3:
    $ncsp=6+2=8$
  Step 4:
    $isum\_sdx=-3+(4-1)\times1=0$
    $isum\_sdy=-3+(4-1)\times1=0$
  Last, compute $CSP=ncsp/4=2$.

Empirically Comparable Data:

This invention used matrix decomposition to develop a new algorithm for computing CSP, which is executed in the hardware and that is recursive and can perform real time updates. Beside that it solved the inability to updates of equation (8), it also possesses high accuracy. In the empirical comparison, it was divided in two parts which is the computation of accuracy and the computation of efficiency. The comparable data used by this invention is the Statistical Reference Datasets (StRD) (http://www.nist.gov/itl/div898/strd (2007/12/01)) proposed by the National Institutes of Standards and Technology (NIST).

Information of StRD

The empirical data used by this invention is the StRD provided by NIST. StRD is the benchmark datasets in the data library of NIST's Statistical Engineering and Mathematical and Computational Sciences Divisions. It was provided to diagnose the accuracy of the following 5 kinds of statistics: (a) univariate summary statistics, (b) Analysis of Variance (ANOVA), (c) linear regression, (d) Markov chain Monte Carlo and (e) nonlinear regression. StRD is recorded using ASCII code and certified values for 15 significant digits are provided in every empirical dataset. This invention cited two, among the five datasets, namely univariate summary statistics and ANOVA to test the computation accuracy of CSS algorithms. Below are the following explanations of the two datasets:

(i) Univariate Summary Statistics

The univariate summary statistics datasets is composed of nine datasets. Each dataset provide the mean, standard deviation and lag-1 autocorrelation coefficient of the 15 correct significant digits to certify the accuracy of the computation. The name, numbers and certified value of the standard deviation of the nine datasets are organized in the first three columns of Table 1. The certified value of CSS shown in the fourth column is the product of the "number of observed value subtracted by 1" after getting the square of the certified value of the standard deviation in column three. The certified value of CSS is used to compare the computation accuracy. These values are represented using the 15 significant digits. The empirical data of StRD can be downloaded from http://www.nist.gov/itl/div898/strd (2007/12/01).

TABLE 1

The certified value of StRD's univariate datasets

| Name of the datasets | Number of data | Certified value of the standard deviation | Certified value of CSS |
|---|---|---|---|
| PiDidits | 5000 | 2.86733906028871 | 41099.9448000000 |
| Lottery | 218 | 291.699727470969 | 18464254.6284404 |
| Lew | 200 | 277.332168044316 | 15305713.1550000 |
| Mavro | 50 | 0.000429123454003053 | 0.000009023200000 |

TABLE 1-continued

The certified value of StRD's univariate datasets

| Name of the datasets | Number of data | Certified value of the standard deviation | Certified value of CSS |
|---|---|---|---|
| Michelso | 100 | 0.0790105478190518 | 0.618024000000000 |
| NumAcc1 | 3 | 1 | 2.00000000000000 |
| NumAcc2 | 1001 | 0.1 | 10.0000000000000 |
| NumAcc3 | 1001 | 0.1 | 10.0000000000000 |
| NumAcc4 | 1001 | 0.1 | 10.0000000000000 | data source: the first three columns are organized from http://www.nist.gov/itl/div898/strd (2007/12/01) and the data in the 4th column is obtained through the transformation made by this invention (ii) ANOVA Datasets ANOVA dataset is composed of 11 datasets. It is mainly used to test the accuracy of ANOVA's different parameters. Each dataset provide the sum of square, determine coefficient (R-square) and the standard error of mean (SEM) of the linear model in the ANOVA table. Each certified value provides 15 exact significant digits. The total sum of square (TSS) in the ANOVA table is the CSS computation indicated in this invention. Considering that the number of data of StRD's univariate summary statistics datasets is relatively few and even Pidigits datasets, with already the most number of data, has only 5000 data, it cannot reflect to the large amount of data collection and computation demand often seen in real world. In the computation of error, it irrefutably showed the accumulative errors in the CSS computation of large quantity data. Therefore, this invention cited the ANOVA datasets that has the most total amount of data, among which are three datasets SmLs03, SmLs06 and SmLs09 which all have 18009 data each. This invention made the ANOVA dataset into another dataset that test the computation accuracy. The names of the 11 datasets and the TSS of the 15 exact significant digits in the ANOVA dataset are the certified values indicated by this invention. The data are organized in Table 2.

TABLE 2

The certified value of StRD's ANOVA datasets

| Name of the datasets | Number of data | Certified value of TSS |
|---|---|---|
| SirStv | 25 | 0.267782821 60000 |
| SmLs01 | 189 | 3.48000000000000 |
| SmLs02 | 1809 | 34.0800000000000 |
| SmLs03 | 18009 | 340.080000000000 |
| AtmWtAg | 48 | 1.413351478166667e−8** |
| SmLs04 | 189 | 3.48000000000000 |
| SmLs05 | 1809 | 34.0800000000000 |
| SmLs06 | 18009 | 340.080000000000 |
| SmLs07 | 189 | 3.48000000000000 |
| SmLs08 | 1809 | 34.0800000000000 |
| SmLs09 | 18009 | 340.080000000000 |

Data source: data are organized from http://www.nist.gov/itl/div898/strd (2007/12/01)
[note]:
e−8 means $10^{-8}$.

I. The Comparison of Computation Accuracy

This invention executed a C++ program using a computer that has hardware of Intel Pentium M processor 1.73 GHz and RAM of 256 MB and Visual Studio.NET2003 platform of Windows XP. The executed computation program of this invention and the "corrected two-pass algorithm" is shown in Appendix 2.

With regards to the comparison of computation accuracy, this invention used the suggested LRE value of Altman et al. (2004) as reference, as in equation (12). The size of the LRE value was used to represent the exact measure of significant digits of the decimal numbers. After computing using the program in Appendix 2, this invention transformed the results into LRE values using manual computation and the LRE values were rounded to the nearest tenths. If the 15 outputted significant digits and the certified value of StRD are similar or in other words, if the 15 significant digits are précised, it is noted with the word "exact".

In comparing accuracy, this invention separated the comparison into two parts: (1) compared with the existing most accuracy algorithm, "corrected two-pass algorithm" and (2) compared with the common data analysis software nowadays, SAS ver 9.0, SPSS ver15.0 and EXCEL 2007. The comparisons were separately explained below.

(1.1) Compared with "Corrected Two-Pass Algorithm"

(i) The comparison of univariate summary statistics dataset

The results of univariate summary statistics dataset is organized in Table 3. As shown in Table 3, the datasets PiDidits, Lottery, Lew, NumAcc1 and NumAcc2 of this invention's algorithm were noted with the word "exact" while the NumAcc2 of the corrected two-pass algorithm" is 14.0. In addition, the LRE value of the dataset Michelso under this invention's algorithm is better than the "corrected two-pass algorithm" and the LRE value of the other datasets are similar with the "corrected two-pass algorithm". According to the results in Table 3, it is shown that the computation accuracy of the algorithm proposed by this invention is at least similar with the results of the "corrected two-pass algorithm".

TABLE 3

The LRE comparison of univariate summary statistics dataset

| Datasets | The algorithm of this invention | Corrected two-pass algorithm |
|---|---|---|
| PiDidits | exact | exact |
| Lottery | exact | exact |
| Lew | exact | exact |
| Mavro | 12.8 | 12.8 |
| Michelso | 13.6 | 13.5 |
| NumAcc1 | exact | exact |
| NumAcc2 | exact | 14.0 |
| NumAcc3 | 9.2 | 9.2 |
| NumAcc4 | 8.0 | 8.0 |

Data source: organized by this invention (ii) The comparison of ANOVA Datasets

The LRE values of the ANOVA datasets were organized in Table 4. It can be seen from Table 4 that the LRE values of the two datasets, SmLs01 and SmLs02, under this invention's algorithm are noted with the word "exact" while the LRE value of SmLs02 dataset under the "corrected two-pass algorithm" is 13.9 which shows that the computation accuracy of the "corrected two-pass algorithm" is not as good as this invention's. In addition, the LRE value of SmLs03 dataset under this invention's algorithm is greater than "corrected two-pass algorithm's" and the other LRE values are similar. From Table 4, the results showed that the accuracy of this invention's algorithm is at least similar with the accuracy of the "corrected two-pass algorithm".

TABLE 4

The LRE comparison of ANOVA dataset

| Datasets | The algorithm of this invention | Corrected two-pass algorithm |
|---|---|---|
| SirStv | 13.2 | 13.2 |
| SmLs01 | exact | exact |
| SmLs02 | exact | 13.9 |
| SmLs03 | 13.8 | 13.1 |
| AtmWtAg | 9.2 | 9.2 |
| SmLs04 | 10.2 | 10.2 |
| SmLs05 | 10.1 | 10.1 |
| SmLs06 | 10.1 | 10.1 |
| SmLs07 | 4.1 | 4.1 |
| SmLs08 | 4.1 | 4.1 |
| SmLs09 | 4.1 | 4.1 |

Data source: organized by this invention

Combining the results of Table 3 and 4, it can be seen that the accuracy of this invention's algorithm is at least similar with the precision of the existing most accuracy algorithm, "corrected two-pass algorithm".

(1.2) Comparison of the Results Obtained using SAS ver9.0, SPSS ver15.0 and EXCEL 2007

In comparing the accuracy of the application softwares, SPSS ver15.0 and EXCEL 2007 did not provide the function of CSS and only SAS ver9.0 provide CSS results which were used as a standard for comparison. With regards to the computation of SPSS ver15.0 and EXCEL2007, this invention used the results obtained from the variance calculation executed by the software after being multiplied to the "number of data subtracted by 1" for comparison. With regards to SAS ver9.0, this invention used the results directly produced by the most commonly used "proc univariate's" CSS for comparison. The comparison between the results of univariate summary statistics dataset and ANOVA dataset are separately stated below:

(i) Comparison of the univariate summary statistics dataset
The comparison of the LRE values of the univariate summary statistics dataset was organized in Table 5. From Table 5, it can be seen that the accuracy of lottery dataset of this invention is better than of SAS ver9.0's. The LRE value of Mavro dataset is greater than the LRE value of SAS ver9.0 and SPSS ver15.0. The LRE value of Michelso dataset is greater than the three application software's. With regards to the LRE values of the other datasets, they are at least greater than or equal to the results of the other three software.

TABLE 5

The comparison among the LRE value of the univariate summary statistics dataset and three different application softwares

| Datasets | The algorithm of this invention | UNIVARIATE of SAS ver9.0 | SPSS ver15.0 | EXCEL 2007 |
|---|---|---|---|---|
| PiDidits | exact | exact | exact | exact |
| Lottery | exact | 14.3 | exact | exact |

TABLE 5-continued

The comparison among the LRE value of the univariate summary statistics dataset and three different application softwares

| Datasets | The algorithm of this invention | UNIVARIATE of SAS ver9.0 | SPSS ver15.0 | EXCEL 2007 |
|---|---|---|---|---|
| Lew | exact | exact | exact | exact |
| Mavro | 12.8 | 12.5 | 11.8 | 12.8 |
| Michelso | 13.6 | 12.1 | 12.1 | 13.5 |
| NumAcc1 | exact | exact | exact | exact |
| NumAcc2 | exact | exact | exact | 11.3 |
| NumAcc3 | 9.2 | 9.1 | 9.2 | 9.2 |
| NumAcc4 | 8.0 | 8.0 | 8.0 | 8.0 |

Data source: organized by this invention (ii) Comparison of ANOVA Dataset
The comparison of the LRE values of the ANOVA datasets were organized in Table 6. Table 6 showed that the LRE value of SirStv dataset of this invention is greater than the value of SAS ver9.0 and SPSS ver15.0. The LRE value of SmLs01 dataset is greater than EXCEL 2007's. The LRE value of SmLs02 dataset is greater than SAS ver9.0's and EXCEL 2007's. The LRE value of SmLs03 data set is smaller than SPSS ver15.0's but greater than SAS ver9.0's and EXCEL 2007's. The accuracy of AtmWtAg, SmLs04, SmLs05 and SmLs06 are all higher than SAS ver9.0's and SPSS ver15.0's. With regards to the three datasets SmLs07, SmLs08 and SmLs09, the LRE values of this invention's algorithm are greater than the values of the three data analysis software. Last, what should be specially mentioned is that the computation of SmLs09 dataset in SAS ver9.0 and EXCEL 2007, the 15 significant digits computed by SAS ver9.0 and EXCEL 2007 were not exact.

TABLE 6

The comparison among the LRE value of ANOVA dataset and application software

| Datasets | The algorithm of this invention | UNIVARIATE of SAS ver9.0 | SPSS 15.0 | EXCEL 2007 |
|---|---|---|---|---|
| SirStv | 13.2 | 13.0 | 12.8 | 13.2 |
| SmLs01 | exact | exact | exact | 12.9 |
| SmLs02 | exact | 14.1 | exact | 12.3 |
| SmLs03 | 13.8 | 13.1 | 14.2 | 10.3 |
| AtmWtAg | 9.2 | 8.8 | 9.1 | 9.2 |
| SmLs04 | 10.2 | 9.0 | 9.4 | 10.2 |
| SmLs05 | 10.1 | 8.1 | 9.8 | 10.1 |
| SmLs06 | 10.1 | 7.5 | 1.1 | 10.1 |
| SmLs07 | 4.1 | 1.1 | 1.0 | 4.0 |
| SmLs08 | 4.1 | 1.1 | 2.2 | 2.2 |
| SmLs09 | 4.1 | Error in the 15 significant digits | 1.1 | Error in the 15 significant digits |

Data source: organized by this invention

Combining the results of Table 5 and 6, it showed that the accuracy of this invention's algorithm is better than the accuracy of the three different application softwares.

II. Comparison of the Efficiency of Computation

In the efficiency of the computation, to solve the computation problem of large amount of data, this invention copied the $2^{nd}$ to $1001^{st}$ set of NumAcc4 of StRD's univariate summary statistics datasets 1000 times and used the total amount of 1000001 data as the comparison of computation efficiency. The efficiency of computation was compared through the length of time used in computation. The program for the length of the computation time period is shown in Appendix 1 and the result of the time of the computation period is organized in Table 7. From the result of the test using 1000001 data, it showed that the length of computation period of the updating algorithm proposed by this invention is evidently shorter than the corrected two-pass algorithm's.

TABLE 7

The comparison of computation period of this invention's algorithm and the corrected two-pass algorithm

| Algorithm | The updating algorithm of this invention | Corrected two-pass algorithm |
|---|---|---|
| Length of the computation period | 5 sec. | 9 sec. |

Data source: organized by this invention

Appendix 1 The mathematical equivalent proof of equation (8) and (1)

The n pair datasets of two variables: $\{X, Y\} = \{(x_1, y_1), (x_2, y_2), \ldots, (x_n, y_n)\}$, d and e separately represent the successive difference vectors of two variables, as $$d^T = [d_1 \, d_2 \ldots d_n]$$

$$e^T = [e_1 \, e_2 \ldots e_n]$$

where, $d_1 = x_1$, $d_i = x_i - x_{i-1}$, $i = 1, 2, \ldots, n$, $e_1 = y_1$, $e_j = y_j - y_{j-1}$, $j = 1, 2, \ldots, n$.

Set $W = [w_{ij}]_{n \times n}$, where $$w_{ij} = (i+j-1)(n+1) - ij - \frac{n}{2}(i+j+|i-j|), \, i, j = 1, 2, \ldots, n.$$

Thus $$CSP = \frac{1}{n} d^T W e$$

$$= \frac{1}{n} \sum_{i=1}^{n} \sum_{j=1}^{n} w_{ij}(x_i - x_{i-1})(y_j - y_{j-1}).$$

Prove:

The data of the two variables (X, Y) separately represented by vectors as $x = [x_1 \, x_2 \ldots x_n]^T$, $y = [y_1 \, y_2 \ldots y_n]^T$, Thus, the data of the two variables x and y can be represented by successive differences as $$x_{n \times 1} = \left[ d_1 \; \sum_{i=1}^{2} d_i \; \sum_{i=1}^{3} d_i \; \ldots \; \sum_{i=1}^{n} d_i \right]^T,$$

$$y_{n \times 1} = \left[ e_1 \; \sum_{i=1}^{2} e_i \; \sum_{i=1}^{3} e_i \; \ldots \; \sum_{i=1}^{n} e_i \right]^T.$$

Then, $x_{n \times 1}$ and $y_{n \times 1}$ are written as $x_{n \times 1} = P_{n \times n} d_{n \times 1}$ and $y_{n \times 1} = P_{n \times n} e_{n \times 1}$, where $$P = \begin{bmatrix} 1 & 0 & 0 & \ldots & 0 \\ 1 & 1 & 0 & \ldots & 0 \\ 1 & 1 & 1 & \ldots & 0 \\ \ldots & \ldots & \ldots & \ddots & \ldots \\ 1 & 1 & 1 & \ldots & 1 \end{bmatrix}_{n \times n}.$$

The element of P's row i and column j is $$p_{ij} = \begin{cases} 1, & j \leq i \\ 0, & j > i \end{cases}, \, i, j = 1, 2, \ldots, n.$$

The mean of the two variables can be represented as $$\bar{x} = \frac{1}{2} \sum_{i=1}^{n} x_i = \frac{1}{2} \sum_{i=1}^{n} (n - i + 1) d_i,$$

$$\bar{y} = \frac{1}{2} \sum_{i=1}^{n} y_i = \frac{1}{2} \sum_{i=1}^{n} (n - i + 1) e_i.$$

Therefore, $\bar{x}_{n \times 1} = Q_{n \times n} d_{n \times 1}$, $\bar{y}_{n \times 1} = Q_{n \times n} e_{n \times 1}$, where, $$Q = \frac{1}{2} \begin{bmatrix} n & n-1 & n-2 & n-3 & \ldots & 1 \\ n & n-1 & n-2 & n-3 & \ldots & 1 \\ \vdots & \vdots & \vdots & \vdots & \ddots & \vdots \\ n & n-1 & n-2 & n-3 & \ldots & 1 \end{bmatrix}_{n \times n},$$

The element of Q's row i and column j is $$q_{ij} = \left[ \frac{1}{2}(n - j + 1) \right]_{n \times n}, \, i, j = 1, 2, \ldots, n.$$

Therefore $$CSP = \sum_{i=1}^{n} (x_i - \bar{x})(y_i - \bar{y})$$

$$= (x_{n \times 1} - \bar{x}_{n \times 1})^T (y_{n \times 1} - \bar{y}_{n \times 1})$$

$$= [(P_{n \times n} - Q_{n \times n}) d_{n \times 1}]^T [(P_{n \times n} - Q_{n \times n}) e_{n \times 1}]$$

$$= d_{1 \times n}^T (P_{n \times n} - Q_{n \times n})^T (P_{n \times n} - Q_{n \times n}) e_{n \times 1}$$

$$= d_{1 \times n}^T (P_{n \times n}^T P_{n \times n} - P_{n \times n}^T Q_{n \times n} - Q_{n \times n}^T P_{n \times n} + Q_{n \times n}^T Q_{n \times n}) e_{n \times 1}$$

Next, compute $P_{n\times n}{}^T P_{n\times n}$, $P_{n\times n}{}^T Q_{n\times n}$, $Q_{n\times n}{}^T P_{n\times n}$ and $Q_{n\times n}{}^T Q_{n\times n}$ separately.

(1) Compute $P_{n\times n}{}^T$n×n

Set $L_{n\times n} = P_{n\times n}^T P_{n\times n}$ $$= \begin{bmatrix} 1 & 1 & 1 & \ldots & 1 \\ 0 & 1 & 1 & \ldots & 1 \\ 0 & 0 & 1 & \ldots & 1 \\ \vdots & \vdots & \vdots & \ddots & \vdots \\ 0 & 0 & 0 & \ldots & 1 \end{bmatrix}_{n\times n} \begin{bmatrix} 1 & 0 & 0 & \ldots & 0 \\ 1 & 1 & 0 & \ldots & 0 \\ 1 & 1 & 1 & \ldots & 0 \\ \vdots & \vdots & \vdots & \ddots & \vdots \\ 1 & 1 & 1 & \ldots & 1 \end{bmatrix}_{n\times n}$$

$$= \left[\sum_{k=1}^{n} p_{ik} p_{kj}\right]_{n\times n}$$

$$= [l_{ij}]_{n\times n}.$$

where, $$l_{ij} = \begin{cases} n-j+1, & i \le j \\ n-i+1, & i > j \end{cases}$$

$$= n - \frac{1}{2}(i+j+|i-j|-2),\; i,j = 1, 2, \ldots, n.$$

(2) Compute $P_{n\times n}{}^T Q_{n\times n}$ and $Q_{n\times n}{}^T P_{n\times n}$ Set $C_{n\times n} = P_{n\times n}^T Q_{n\times n}$ $$= \begin{bmatrix} 1 & 1 & \ldots & 1 & 1 \\ 0 & 1 & \ldots & 1 & 1 \\ \vdots & \vdots & \ddots & \vdots & \vdots \\ 0 & 0 & \ddots & 1 & 1 \\ 0 & 0 & \ldots & 0 & 1 \end{bmatrix}_{n\times n} \frac{1}{n}\begin{bmatrix} n & n-1 & n-2 & n-3 & \ldots & 1 \\ n & n-1 & n-2 & n-3 & \ldots & 1 \\ \vdots & \vdots & \vdots & \vdots & \ddots & \vdots \\ n & n-1 & n-2 & n-3 & \ldots & 1 \end{bmatrix}_{n\times n}$$

$$= \left[\sum_{k=1}^{n} p_{ik} p_{kj}\right]_{n\times n}$$

$$= [c_{ij}]_{n\times n},$$

where $$c_{ij} = \frac{1}{n}(n-j+1)(n-i+1),\; i,j = 1, 2, \ldots, n.$$

and also $$c_{ij} = c_{ij} = \frac{1}{n}(n-i+1)(n-j+1)$$

that is, $P_{n\times n}{}^T Q_{n\times n} = (P_{n\times n}{}^T Q)^T Q_{n\times n}{}^T P_{n\times n}$.

(3) Compute $Q^T Q$

Set $R_{n\times n} = Q_{n\times n}^T$ $$= \frac{1}{n}\begin{bmatrix} n & n & \ldots & n & n \\ n-1 & n-1 & \ldots & n-1 & n-1 \\ \vdots & \vdots & \ldots & \vdots & \vdots \\ 2 & 2 & \ldots & 2 & 2 \\ 1 & 1 & \ldots & 1 & 1 \end{bmatrix}$$

$$\frac{1}{n}\begin{bmatrix} n & n-1 & n-2 & n-3 & \ldots & 1 \\ n & n-1 & n-2 & n-3 & \ldots & 1 \\ \vdots & \vdots & \vdots & \vdots & \ddots & \vdots \\ n & n-1 & n-2 & n-3 & \ldots & 1 \end{bmatrix}$$

$$r_{ij} = \sum_{k=i}^{n} q_{ik} q_{kj}$$

$$= [r_{ij}]_{n\times n},$$

where $$r_{ij} = \frac{1}{n}(n-j+1)(n-i+1),\; i,j = 1, 2, \ldots, n.$$

It can be seen that $P^T Q = Q^T P = Q^T Q$,

Therefore, $(P-Q)^T (P-Q) = P^T P - P^T Q - Q^T P + Q^T Q = P^T P - P^T Q$.

Next,

Prove $P_{n\times n}^T P_{n\times n} - P_{n\times n}^T Q_{n\times n} = [l_{ij} - c_{ij}]_{n\times n}$
$$= w_{n\times n},$$

$$l_{ij} - c_{ij} = n - \frac{1}{2}(i+j+|i-j|-2) - \frac{1}{n}(n-i+1)(n-j+1)$$

$$= \frac{1}{n}\left(n^2 - \frac{n}{2}(i+j+|i-j|) - n - (n-i+1)(n-j+1)\right)$$

$$= \frac{1}{n}\left((i+j-1)(n+1) - ij - \frac{n}{2}(i+j+|i-j|)\right)$$

$$= \frac{1}{n} w_{ij}.$$

APPENDIX 2

$1^{st}$ program: Corrected two-pass algorithm program

```
/************Corrected two pass algorithm                    **************************/
/************ author:inventors of this invention ****** date: 2007/12/01        ******/
/************                                                                *********/
/*******************************************************************************/
#include "stdafx.h"
#using <mscorlib.dll>
using namespace System;
using namespace std;
#include <stdio.h>
#include <cMath>
#include <time.h>
#define n 1000001
int
main(void)
    {
    FILE *input_file;
    FILE *output_file;
    time_t start, end;        /*define the variable for the length of computation period */
```

APPENDIX 2-continued

```
    double x,y,t=0.0,ss=0.0,c=0.0,d=0,css=0.0,average=0.0,sum=0.0, var=0.0, std=0.0; /*declare
variable*/
        int i ;
        input_file = fopen("10_7.txt","r");
/**********************************************************************/
/*** read data for the first time, compute mean ******************************/
/**********************************************************************/
        start =time(NULL);
        for (i=1;i<= n;i++)
            {
            fscanf(input_file,"%1f", &x);
            sum = sum + x;     /*compute the total of all the data*/
            }
        average =sum/n;       /* compute the mean of all the data*/
        fclose(input_file);
/**********************************************************************/
/*** read data for the second time, compute CSS and corrected CSS *************/
/**********************************************************************/
        input_file = fopen("10_7.txt","r");
        for (i=1;i<=n;i++)
            {
                fscanf(input_file,"%1f",&y);
                c =y-average;
                ss=ss + c*c;
            d = d+c;
            }
        css = ss- d*d/n;
        var = css/(n-1);
        std = sqrt(var);
        end=time(NULL);
        output_file = fopen("timeout_10_7.txt","w");
        fprintf(output_file ,"%15.14e \n",css);
        fprintf(output_file ,"time= %.10f second.\n",difftime(end,start));
        fclose(input_file);
        system("PAUSE");
}
2nd program: This invention's recursive and updatable algorithm program
/******************* This invention's algorithm program ********************/
/******* author: inventors of this invention ****** date: 2007/12/01 ***************/
/******* The filename of "filename.TXT" in the program is named as StRD dataset **/
/******* The "StRD dataset" should be set first when executing different datasets ****/
/**********************************************************************/
#include "stdafx.h"
#using <mscorlib.dll>
using namespace System;
#include <stdio.h>
#include <Math.h>
#include <cmath>
#include <time.h>
#define n 1001
int
main(void)
    {
        FILE *input_file;
        FILE *output_file;
        double data=0.0, sd = 0.0, ss=0.0, css=0.0, dd=0.0, w=0.0;
        int i ;
            time_t start,end;
            input_file = fopen("10_7.txt","r");
    output_file = fopen("timeout_107.txt","w");
        start =time(NULL);
        for (i=1;i<=n; i++)
        {
            fscanf(input_file, "%1f", &data);
            sd = data-dd ;
            css += (ss=ss+2*w*sd+(i-1)*sd*sd);
            w = w+(i-1)*sd;
            dd = data;
        }
        css=css/n;
        end =time(NULL);
fprintf(output_file ,"%15.14e \n",css);
 fprintf(output_file, "time= %.10f second.\n", difftime(end,start));
 system("PAUSE");
    }
```

What is claimed is:

1. A computer-implemented method for performing real time updating computations so as to economize the use of hardware resources and enhancing the computation and accuracy of CSS (Corrected Sums of Squares) of computing hardware and to promote the computation speed of computing hardware, further comprising five steps:
   Step 1: set 6 variables to be used in a computation for computing multiple sets of data as:
   a $1^{st}$ variable is a successive difference values of the first variable, called sdx;
   a $2^{nd}$ variable is a successive difference values of the second variable, called sdy;
   a $3^{rd}$ variable is a successive difference of an iterated weighted sum of the first variable, called isum$_{\_sdx}$;
   a $4^{th}$ variable is a successive difference of an iterated weighted sum of the $2^{nd}$ variable, called isum_sdy;
   a $5^{th}$ variable is an updated variable used every time the CSS is computed, called sp;
   a $6^{th}$ variable is a variable used every time the CSS of n times is computed, called ncsp;
   Step 2:
   Compute the successive differences of the first and second variables;
   Step 3:
   (i) subtract 1 from a number of the multiple sets of data, multiply with the needed sdx of the number of the multiple sets of data, then multiply with the sdy of the computing terms;
   (ii) multiply isum_sdx with sdy and isum_sdy with sdx, add all the values in (i) and (ii), then add an acquired sp before and save in sp;
   Step 4:
   Add the sp in step 3 to ncsp, then save in ncsp;
   Step 5:
   Execute a recursive computation for isum_sdx and isum_sdy;
   (i) subtract 1 from the number of the multiple sets of data, multiply with the needed sdx of the computed number then add isum_sdx and last, save as isum$_{\_sdx}$;
   (ii) subtract 1 from the number of the multiple sets of data, multiply with the needed sdy of the computing terms then add isum_sdy and last, save as isum_sdy;
   wherein when a new set of data or next number is added, go back to step 1 and repeat the computation;
   wherein the computing hardware directly computes the product of a weighted coefficient;
   wherein the method further comprises causing the computer hardware to perform real time updating computations so to economize the use of hardware resources.

2. A computer-implemented method for rapidly computing a corrected sum of products (CSP) via a computing hardware, comprising a step of multiplying two successive differences and a corresponding weighted coefficient $w_{ij(n)}$ together so as to obtain a product $w_{ij(n)}sdx_i sdy_j$, the step being performed sequentially from values of a first term onward until a last set of data is input, the products obtained being sequentially summed up, thereby obtaining an n-fold value of the CSP, the method being represented by:

$$nCSP_n = \sum_{i=1}^{n}\sum_{j=1}^{n} w_{ij(n)} sdx_i sdy_j$$

where $w_{ij(n)}$ is calculated as:

$$w_{ij(n)} = (n+1)(i+j-1) - ij - \frac{n}{2}(i+j+|i-j|);$$

i and j are indices; n is a total number of a sets of data; $sdx_i$ is one of the successive differences; and $sdy_j$ is the other of the successive differences;
wherein the computing hardware directly computes the product of a weighted coefficient;
wherein the method furthere comprises causing the computer hardware to perform real time updating computations so as to economize the use of hardware resources.

3. The method of claim 2, wherein, after obtaining the n-fold value of the CSP (i.e., $CSP_n$) of a particular said term and upon entry of an additional set of data, an $CSP_{n+1}$ of the additional set of data is calculated by multiplying two successive differences and a corresponding weighted coefficient $g_{ij}$ together so as to obtain a product $g_{ij}sdx_i sdy_j$, the multiplication being performed sequentially from the values of the first term onward, the products obtained being sequentially summed up, thereby obtaining an updating term $$\sum_{i=1}^{n+1}\sum_{j=1}^{n+1} g_{ij} sdx_i sdy_j,$$

which is added to the n-fold value of the CSP (i.e., $CSP_n$) of the particular said term to obtain an(n+1)-fold value of the $CSP_{n+1}$, as represented by:

$$(n+1)CSP_{n+1} = nCSP_n + \sum_{i=1}^{n+1}\sum_{j=1}^{n+1} g_{ij} sdx_i sdy_j$$

where $g_{ij}$ is expressed by:

$$g_{ij} = \frac{1}{2}(i+j-|i-j|-2); i$$

i and j are indices; n is a total number of the sets of data $sdx_i$ is one of he successive differences; and $sdy_j$ is the other of the successive differences.

* * * * *